United States Patent
Kikkawa et al.

(10) Patent No.: US 6,996,113 B2
(45) Date of Patent: Feb. 7, 2006

(54) DATA RELAY UNIT AND MULTIPLEX COMMUNICATION SYSTEM CAPABLE OF INHIBITING DATA RELAY IN RESPONSE TO FAILURE

(75) Inventors: Hajime Kikkawa, Nagoya (JP); Tomohisa Kishigami, Obu (JP); Jiro Sato, Kariya (JP); Shinichi Senoo, Kariya (JP)

(73) Assignee: Denso Corporation, Kariya (JP)

( * ) Notice: Subject to any disclaimer, the term of this patent is extended or adjusted under 35 U.S.C. 154(b) by 908 days.

(21) Appl. No.: 09/897,015

(22) Filed: Jul. 3, 2001

(65) Prior Publication Data
US 2002/0018479 A1    Feb. 14, 2002

(30) Foreign Application Priority Data
Jul. 26, 2000 (JP) ............................. 2000-224811

(51) Int. Cl.
*H04L 12/28* (2006.01)

(52) U.S. Cl. ...................... 370/401; 370/420

(58) Field of Classification Search ............... 370/401, 370/438, 230, 235, 242, 252, 257, 294, 299, 370/300, 357, 360, 389, 400, 419, 428, 433, 370/442, 444, 463, 465, 474, 476, 402, 403, 370/404, 405, 422, 396, 386, 392
See application file for complete search history.

(56) References Cited

U.S. PATENT DOCUMENTS

| 4,546,468 A | * | 10/1985 | Christmas et al. | 370/376 |
| 4,975,906 A | * | 12/1990 | Takiyasu et al. | 370/401 |
| 5,144,622 A | * | 9/1992 | Takiyasu et al. | 370/401 |
| 5,224,096 A | * | 6/1993 | Onishi et al. | 370/452 |
| 5,315,592 A | * | 5/1994 | Conant et al. | 370/401 |
| 5,379,292 A | * | 1/1995 | Kurata et al. | 370/216 |
| 5,566,203 A | * | 10/1996 | Brief et al. | 375/211 |
| 5,610,913 A | * | 3/1997 | Tomonaga et al. | 370/219 |
| 5,793,769 A | * | 8/1998 | Murono et al. | 370/401 |
| 5,859,845 A | * | 1/1999 | Oniishi et al. | 370/386 |
| 2002/0122443 A1 | * | 9/2002 | Enam et al. | 370/537 |

FOREIGN PATENT DOCUMENTS

| EP | 0886404 A2 | 12/1998 |
| JP | A-8-204879 | 8/1996 |
| JP | A-H08-335948 | 12/1996 |
| JP | A-2000-183940 | 6/2000 |

* cited by examiner

*Primary Examiner*—Phirin Sam
(74) *Attorney, Agent, or Firm*—Posz Law Group, PLC

(57) ABSTRACT

A multiplex communication system includes a plurality of networks and a data relay unit. Each node included in each network resets a relay flag which is a predetermined bit of a data frame, when it sends the data frame to another node. If the data frame requires to be relayed, the data relay unit receives and relays the data frame. The data relay unit includes a relay flag check (RFC) section and a relay flag setting (RFS) section. The RFC section checks whether the relay flag of the data frame is set. If relay flag is set, the RFC section inhibits the data frame from being relayed. If the relay flag is not set, the RFC section allows the data frame to be relayed. The RFS section sets the relay flag of the data frame when the data frame is relayed.

5 Claims, 8 Drawing Sheets

DATA RELAY UNIT AND MULTIPLEX COMMUNICATION SYSTEM CAPABLE OF INHIBITING DATA RELAY IN RESPONSE TO FAILURE

CROSS REFERENCE TO RELATED APPLICATION

This application is based on and incorporates herein by reference Japanese Patent Application No. 2000-224811 filed on Jul. 26, 2000.

BACKGROUND OF THE INVENTION

1. Field of the Invention

The present invention relates to a data relay unit and a multiplex communication system and, more particularly to a method for controlling relay of a data frame when a failure occurs in the multiplex communication system.

2. Related Art

In recent years, sophistication of communication networks advances as computer technology advances. In the field of motor vehicles, the volume of information exchanged among electronic control units (ECUs) which control respective electrical components installed on a vehicle increases rapidly. Therefore a multiplex communication system is employed for communication among the ECUs in the vehicle so that the number of wire harnesses required for the communication is reduced.

In the multiplex communication system, ECUs are connected as nodes to a common multiplex communication line and communicate each other by exchanging data frames through the common communication line. In the case of the vehicle, all ECUs are appropriately divided into a plurality of groups according to the required communication speed. Thus a plurality of networks corresponding to the respective groups are formed for efficient data communication among the ECUs. Communication between two ECUs belonging to different networks is performed via a data relay unit.

In the data relay unit, terminals to which the respective communication lines are connected and internal circuits which receive data frames via the respective terminals are all concentrated at one place. In recent years, package density is generally increased as the need for miniaturization of devices is increased. Therefore the terminals and inner circuits of the data relay unit are also arranged so as to be close to each other. Accordingly, there is a possibility that the communication lines of the different networks are shorted due to foreign matter or water which enters the system. When such short occurs, a data frame which has been relayed to the destination network by the data relay unit would appear on the communication line of the sender network again. In this case, the data frame is relayed by the data relay unit again, and this is repeated endlessly. As a result, communication load is increased rapidly.

EP0886404A2 (JP-A-H11-8653) discloses a system which includes a plurality of data relay units and communication lines. The communication lines connect the data relay units so that a mesh network is formed. In this system, each node sets time to live (TTL) in a data frame when it sends the data frame to the destination node. If the data frame cannot be sent to the destination node due to a failure of one of the communication lines, a new route is established. However, the data frame would be relayed repeatedly until the new route is established. Accordingly, this system discards the data frame when the TTL of the data frame reaches, so that the data frame is prevented from being relayed repeatedly for a considerable time.

If this technique is employed to solve the above problem in the present multiplex communication system, each node is required to include a section for setting the TTL of a data frame. Further this technique which is devised for the mesh network is not cost-effective in this case, because the mesh network is not formed in the multiplex communication system.

SUMMARY OF THE INVENTION

The present invention has an object to provide a data relay unit and a multiplex communication system in which a data frame is prevented from being relayed repeatedly and endlessly when a failure occurs, and a simple method therefore.

A data relay unit according to the present invention includes a plurality of send/receive (SR) sections for sending and receiving data frames. Each of the data frame is received by a first SR section which is one of the SR sections, and sent by a second SR section which is another of the SR sections. A predetermined bit of each data frame is assigned to an identifier. The data relay unit further includes an identifier setting section and a relay inhibiting section. The identifier setting section sets the identifier of the data frame received by the first SR section to a value which represents that the identifier is set before the data frame is sent by the second SR section. The relay inhibiting section checks whether the identifier of the data frame received by the first SR section is set and inhibiting the data frame from being sent by the second SR section if it is determined that the identifier is set. Even if the data relay unit receives the data frame which has been already relayed, the relay inhibiting section can prevent the data frame from being relayed again by checking the identifier.

Preferably, a predetermined bit of a priority field of a data frame is assigned to the identifier, so that the system is easily implemented by modifying the existing multiplex communication system.

BRIEF DESCRIPTION OF THE DRAWINGS

The above and other objects, features and advantages of the present invention will become more apparent from the following detailed description made with reference to the accompanying drawings. In the drawings

DETAILED DESCRIPTION OF THE PREFERRED EMBODIMENT (First Embodiment)

Figure 1:
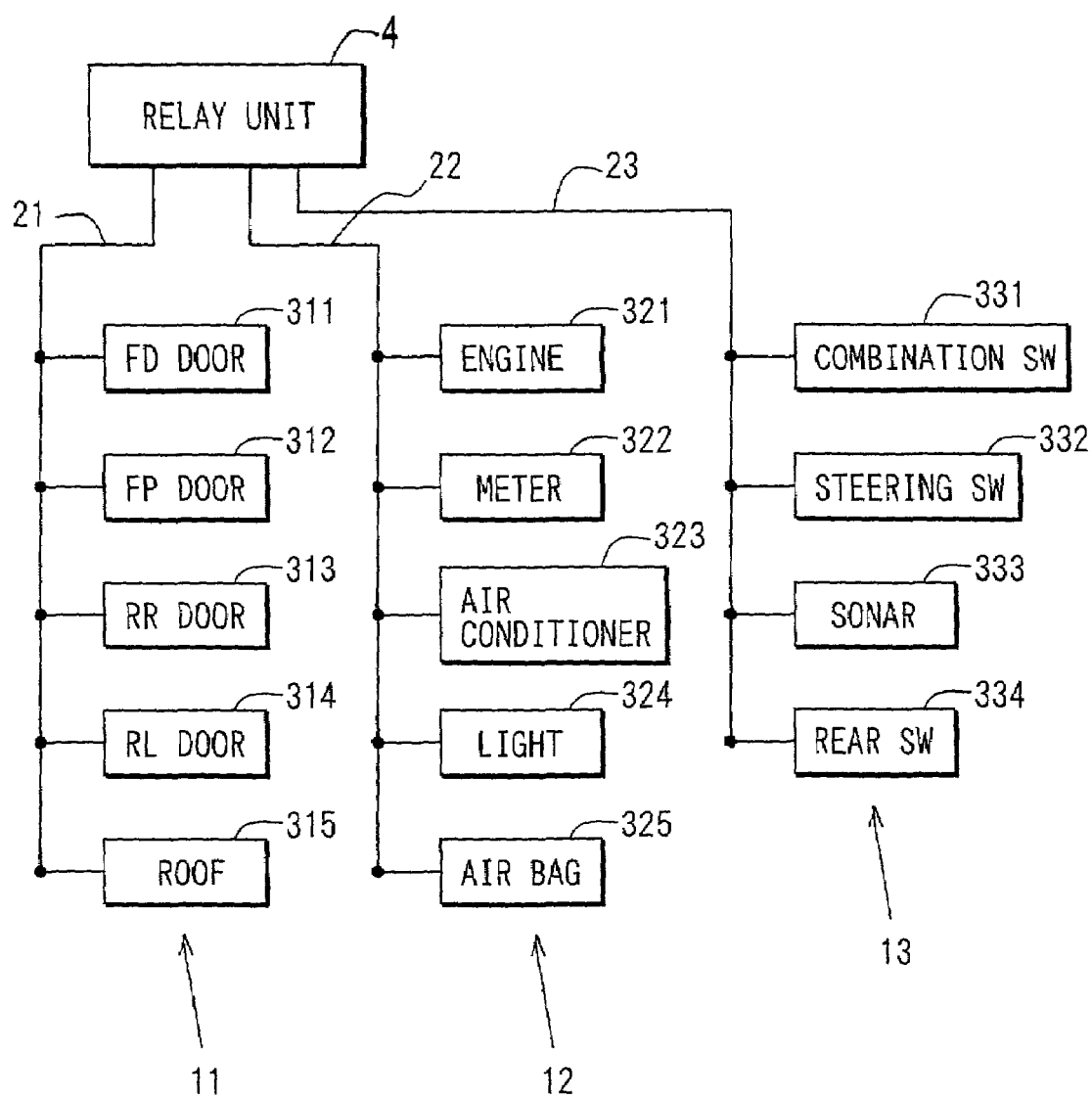
FIG. 1 is a block diagram of a multiplex communication system according to a first embodiment of the present invention.

Referring to FIG. 1, a multiplex communication system includes a plurality of networks 11–13 and a data relay unit 4. Each network 11–13 is formed by connecting at least one node 311–315, 321–325, 331–334 to a multiplex communication line 21–23. The nodes belonging to the same network communicate one another by exchanging data frames according to a predetermined communication protocol.

When the multiplex communication system is used for communication among ECUs belonging to a body system in a vehicle, the first network 11 includes ECU 311 for a front driver's (FD) side door, ECU 312 for a front passenger's (FP) side door, ECU 313 for a rear right (RR) door, ECU 314 for a rear left (RL) door, and ECU 315 for a roof as nodes. The second network 12 includes ECU 321 for an engine, ECU 322 for a meter, ECU 323 for an air-conditioner, ECU 324 for a light, and ECU 325 for an airbag as nodes. The third network 13 includes ECU 331 for a combination switch, ECU 332 for a steering switch, ECU 333 for a sonar, and ECU 334 for a rear switch as nodes.

All the communication lines 21–23 are connected to the data relay unit 4. The data relay unit 4 is provided to relay a data frame received from a node (sender node) belonging to a network (sender network) 11–13 to another node (destination node) belonging to a network 11–13 (destination network) other than the sender network.

Figure 2:
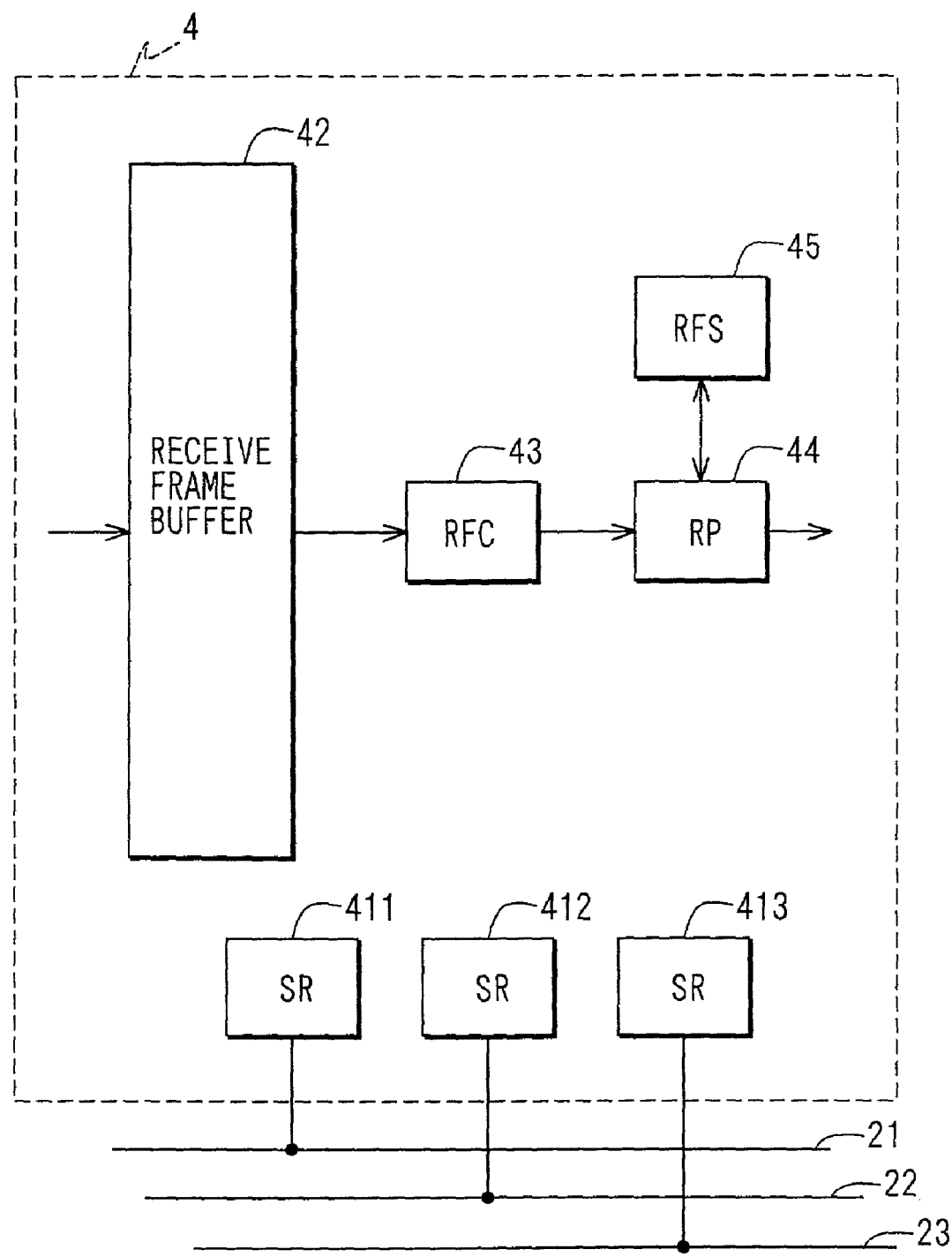
FIG. 2 is a functional block diagram of a data relay unit included in the multiplex communication system according to the first embodiment.

Referring to FIG. 2, the data relay unit 4 includes a plurality of frame send/receive (SR) sections 411–413 corresponding to the respective networks 11–13, a receive frame buffer 42, a relay flag check (RFC) section 43, a relay processing (RP) section 44, and a relay flag setting (RFS) section 45. Each communication line 21–23 is connected to the corresponding frame SR section 411–413. The data relay unit 4 is formed with a communication IC, a microcomputer and the like.

Figure 3:
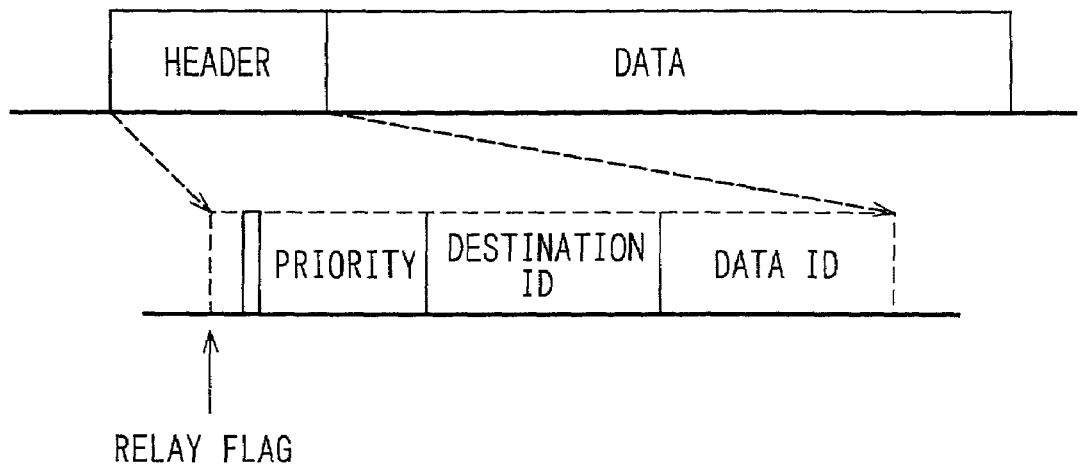
FIG. 3 is a diagram of a format of a data frame according to BEAN protocol.

Referring to FIG. 3, a data frame according to various communication protocols employed by each network 11–13 includes a header field and a data field in common. According to BEAN protocol, the header field includes a priority field, a destination ID field, a data ID field. The data field holds a data body.

The priority field holds a priority which represents the level of the priority which the data frame has over other data frames when the data frame is sent over the communication line. If data frames from a plurality of nodes are sent over the same communication line simultaneously, arbitration among the data frames is performed according to the priorities of the data frames. For example, when a node sends a data frame of priority '0' over the communication line, it stops sending the data frame if a data frame of priority '1', which represents higher priority, is already on the communication line. In this way, only one node finally wins the right to send a data frame over the communication line and can send the data frame without stopping.

The destination ID field holds the ID of the destination node of the data frame. The data ID field holds a data ID which represents the type of the data included in the data body. The data types of the data exchanged in the present system are 'engine speed', 'vehicle speed', 'opened/closed state of doors' or the like.

A predetermined bit of the priority field of a data frame is used as a relay flag. The relay flag of a data frame is set to '0' when the sender node sends the data frame, and set to '1' when the data relay unit 4 relays the data frame. Accordingly, if the relay flag is '1', the data frame has already been relayed, that is, the data relay unit 4 has received the data frame before. If the relay flag is '0', the data frame has not been relayed, that is, the data frame has never been relayed. For example, the highest order bit of the priority field is assigned to the relay flag. The highest order bit means a bit which is outputted from the sender node to the communication line first.

Figure 4:
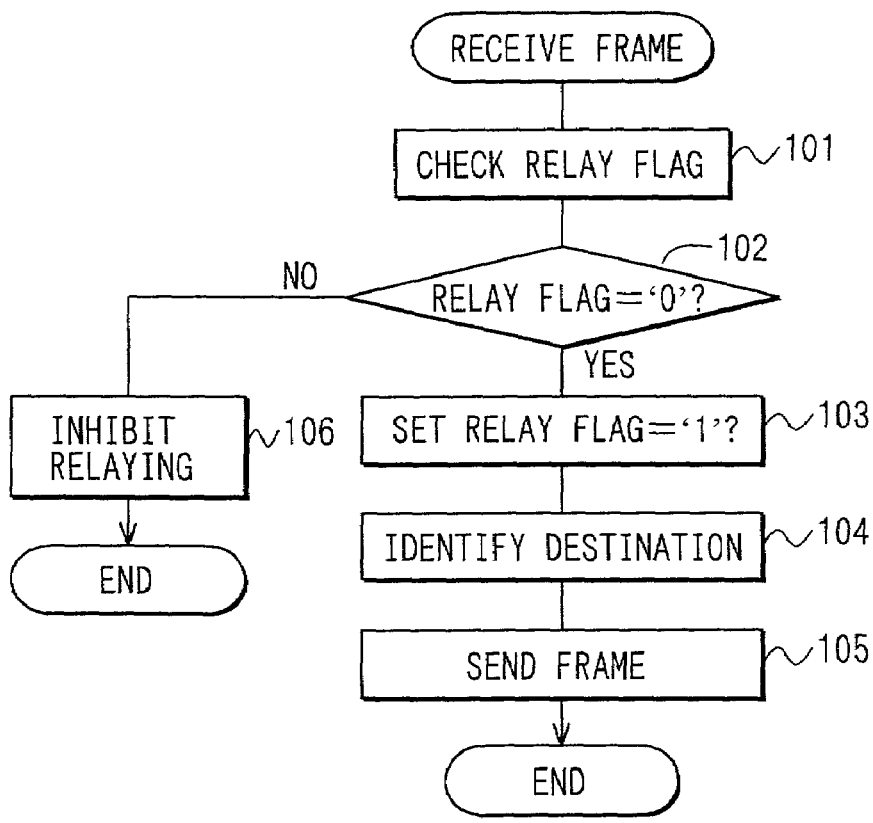
FIG. 4 is a flowchart of the control performed by the data relay unit.

The data relay unit 4 is programmed to operate as shown in FIG. 4. The unit 4 receives a data frame from one (sender ECU) of the ECUs 311–315, 321–325, 331–334 via the SR section 411–413 corresponding to the sender network 11–13. The received data frame is temporarily stored in the receive frame buffer 42. A predetermined area of a RAM is allocated for the receive frame buffer 42.

When the data frame stored in the receive frame buffer 42 requires to be relayed, the RFC section 43 extracts the predetermined bit (relay flag) from the priority field of the data frame and checks whether the bit is '0' at step 101.

If the RFC section 43 determines that the relay flag is '0' at step 102, the RFS section 45 sets the relay flag to '1' at step 103 and the data frame is provided for the RP section 44. At step 104, the RP section 44 extracts the data ID from the data frame, and identifies the destination network by referring to a destination table (not shown) based on the extracted data ID. That is, the RP section 44 identifies the frame SR section 411–413 which ought to send the data frame. The destination table correlates the destination networks with each of the data IDs. The RP section 44 outputs the data frame in which the relay flag is '1' to the identified frame SR section 411–413. The identified frame SR section 411–413 sends the data frame at a predetermined point of time at step 105.

On the other hand, if the RFC section 43 determines that the relay flag is not '0' at step 102, the data frame is not provided for the RP section 44. In this way, the RP section 44 is inhibited from performing the process for relaying the data frame at step 106.

(Second Embodiment)

Figure 5:
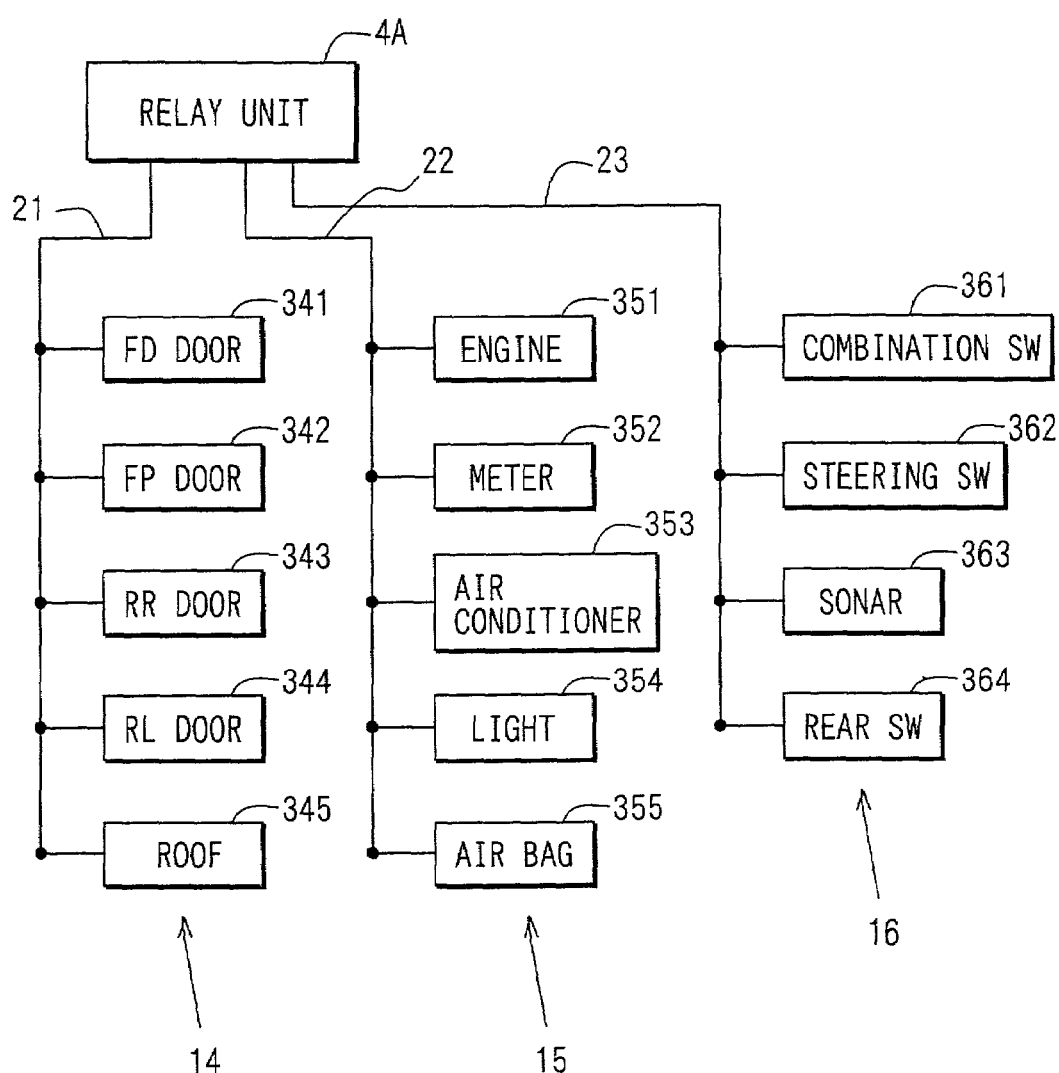
FIG. 5 is a block diagram of a multiplex communication system according to a second embodiment of the present invention.

Referring to FIG. 5, a multiplex communication system according to a second embodiment has the same configuration as the first embodiment. That is, it includes a plurality of networks 14–16 and a data relay unit 4A. Each network 14–16 includes a multiplex communication line 21–23 and at least one ECU 341–345, 351–355, 361–364 connected to the multiplex communication line 21–23 as nodes.

Figure 6:
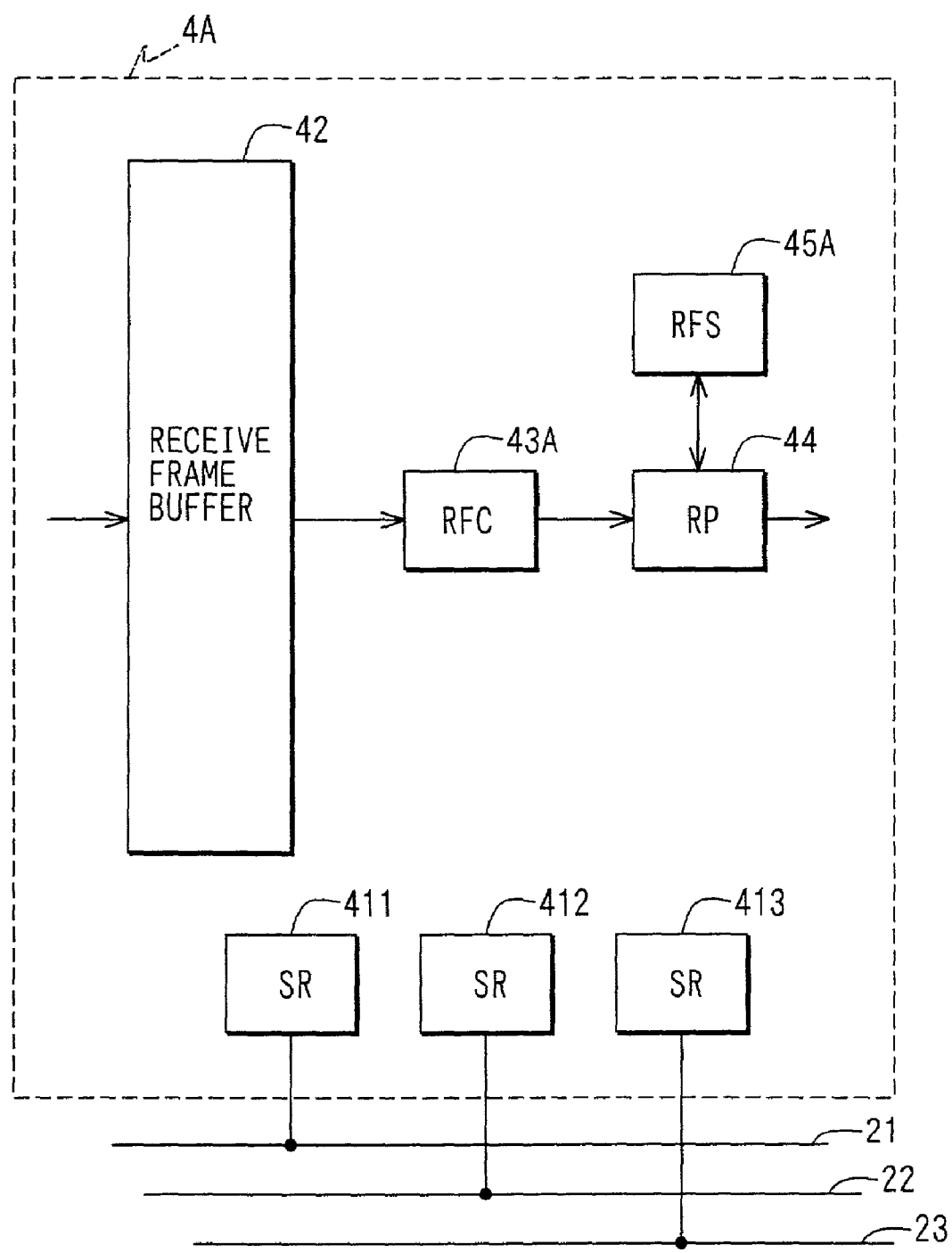
FIG. 6 is a functional block diagram of a data relay unit included in the multiplex communication system according to the second embodiment.

Referring to FIG. 6, the data relay unit 4A has a similar configuration to the first embodiment, and operates similarly to the first embodiment. However, in the present embodiment, a predetermined bit of the data field of a data frame is assigned to a relay flag. Accordingly, in the data relay unit 4A, a RFC section 43A extracts the predetermined bit (relay flag) from the data field of the data frame and checks whether the bit is '0'. A RFS section 45A sets the relay flag, which is the predetermined bit of the data field, to '1'.

Each ECU 341–345, 351–355, 361–364 has a similar configuration to the first embodiment. However, each ECU 341–345, 351–355, 361–364 recognizes the predetermined bit of the data field of a data frame as a bit irrelevant to the data of the data frame. For example, when the data ID of the data frame is 'vehicle speed', the ECU 341–345, 351–355, 361–364 extracts data bits except the predetermined bit from the data field as the data which represents the vehicle speed.

(Third Embodiments)

Figure 7:
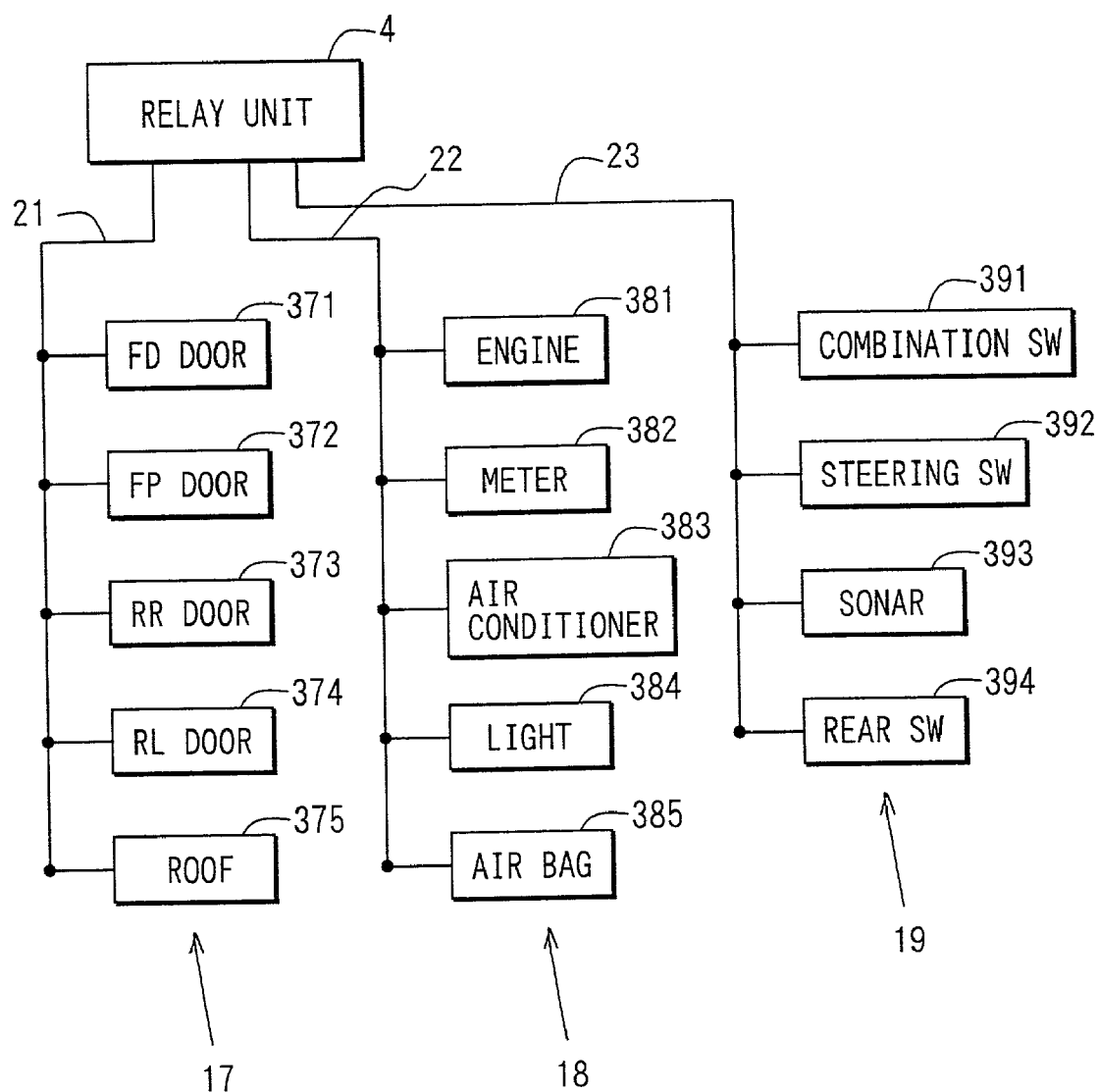
FIG. 7 is a block diagram of a multiplex communication system according to a third embodiment of the present invention.

Referring to FIG. 7, a multiplex communication system according to a third embodiment has the same configuration as the first embodiment. That is, it includes a plurality of networks 17–19 and a data relay unit 4. Each network 17–19 includes a multiplex communication line 21–23 and at least one ECU 371–375, 381–385, 391–394 connected to the multiplex communication line 21–23 as nodes. A predetermined bit of the priority field of a data frame is assigned to a relay flag similarly to the first embodiment. The data relay unit 4 also has the same configuration as the first embodiment, and operates in the same way.

Figure 8:
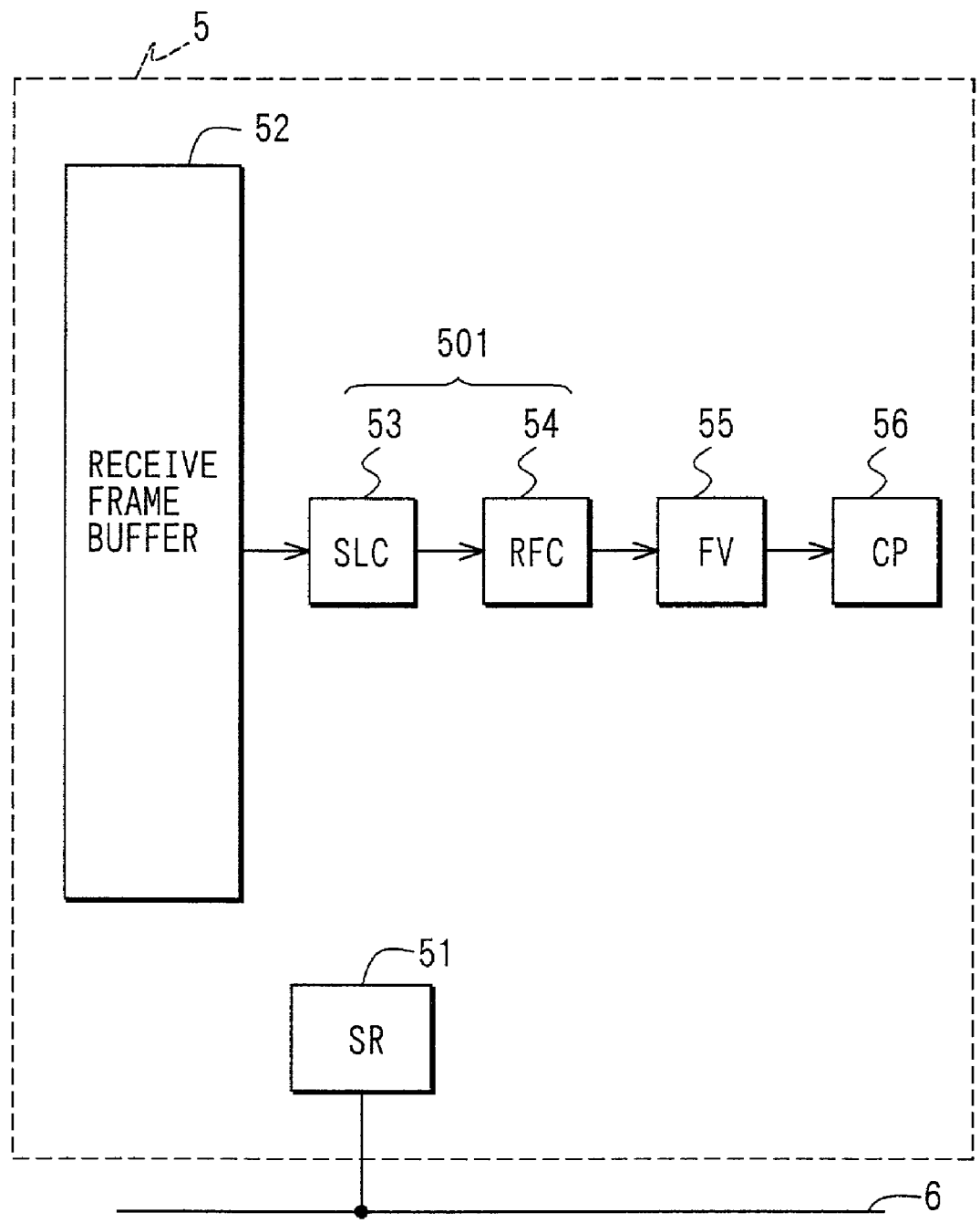
FIG. 8 is a functional block diagram of each node included in the multiplex communication system according to the third embodiment.

Referring to FIG. 8, a node 5 represents each of the ECUs 371–375, 381–385, 391–394 and a communication line 6 represents the communication line 21–23 connected to each of the ECUs 371–375, 381–385, 391–394. The node 5 has a similar configuration to the first embodiment. However, the node 5 is constructed as shown in FIG. 8. Further the node 5 is programmed to check whether a data frame sent from another node to the node 5 is valid as shown in FIG. 9.

As shown in FIG. 8, the node 5 includes a frame SR section 51 connected to the communication line 6 and receives the data frame via the frame SR section 51. The received data frame is temporarily stored in a receive frame buffer 52. The node 5 includes a check section 501 which comprises a sender line check (SLC) section 53 and a relay flag check section 54.

Figure 9:
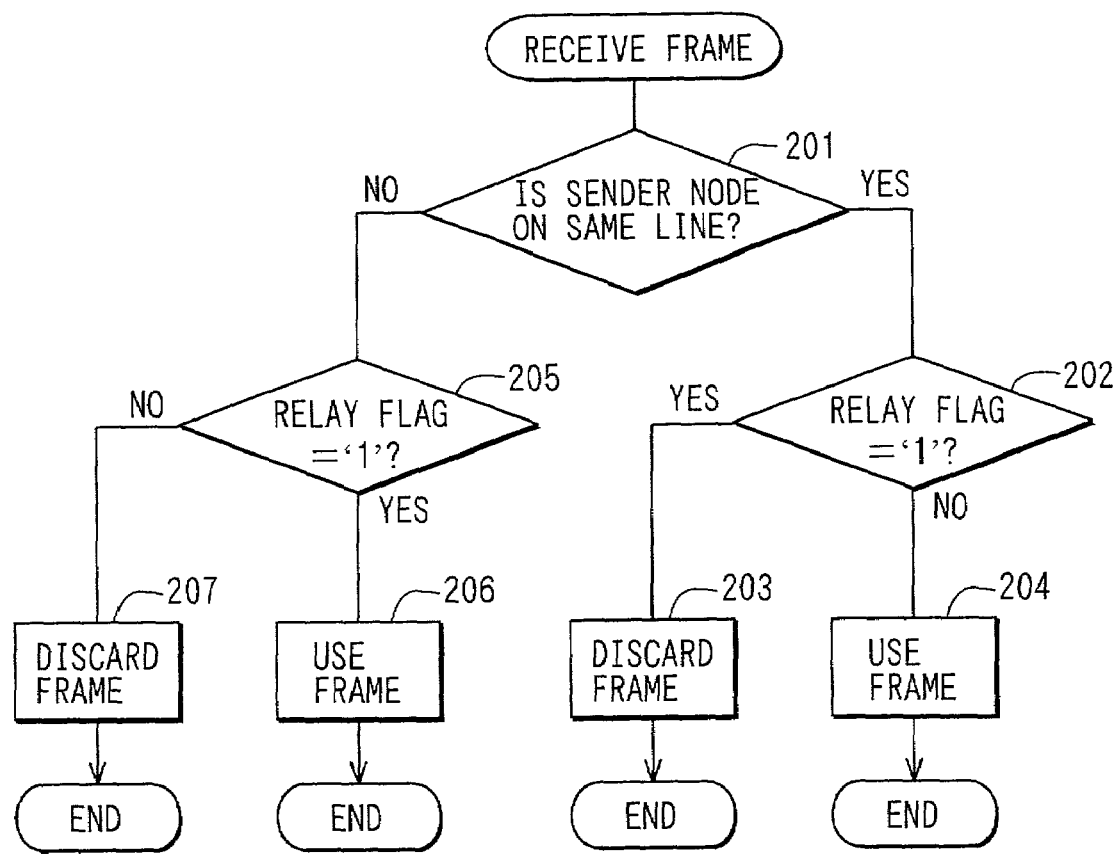
FIG. 9 is a flowchart of the control performed by the node shown in FIG. 8.

Referring to FIG. 9, at step 201, the SLC section 53 checks whether the received data frame is sent by a node connected to the same communication line 6. That is, the SLC section 53 checks whether the sender node of the data frame belongs to the same network (destination network) as the node 5.

The SLC section 53 includes a table which provides information which represents whether the sender node of a data frame belongs to the destination network based on the data ID of the data frame.

The SLC section 53 determines whether the sender node of the data frame belongs to the destination network by referring to the table at step 201. If the conclusion of this determination is 'YES', it is inferred that the data frame has been sent to the node 5 without being relayed by the data relay unit 4. If the conclusion is 'NO', it is inferred that the data frame has been sent to the node 5 via the data relay unit 4.

If the conclusion at step 201 is 'YES', the RFC section 54 extracts the predetermined bit (relay flag) from the priority field of the data frame and checks whether the relay flag is '1' at step 202. If the conclusion at step 201 is 'NO', the RFC section 54 extracts the predetermined bit (relay flag) from the priority field of the data frame and checks whether the relay flag is '1' at step 205. If the conclusion at step 202 or 205 is 'YES', it is inferred that the data frame has been sent to the node 5 via the data relay unit 4. If the conclusion is 'NO', it is inferred that the data frame has been sent to the node 5 without being relayed by the data relay unit 4.

A frame verification (FV) section 55 receives the conclusion at step 201 and the conclusion at step 202 or 205 from the SLC section 53 and the RFC section 54. If the conclusion at step 201 is 'YES' and the conclusion at step 202 is 'YES', the FV section 55 invalidates the data frame because the two conclusions contradict each other. That is, the data frame which should not be relayed has been relayed. From this, it is inferred that the data frames (first frame and second frame) which have the same data have been sent to the node 5 and a second destination node belonging to a second destination network, respectively. Further it is inferred that the second data frame relayed to the second destination network has appeared on the communication line 6 due to short of two communication lines belonging to the destination network and the second destination network, and has been received by the node 5. Accordingly, the node 5 already has received or will receive the first data frame (proper data frame). Therefore, the invalidated data frame (second data frame) is discarded at step 203. That is, the invalidated data frame is not provided for a control processing (CP) section 56 so that control is not performed repeatedly based on the same data of the first and second data frames If the conclusion at step 201 is 'YES' and the conclusion at step 202 is 'NO', the FV section 55 validates the data frame because the two conclusions agree. Consequently, the validated data frame is provided for the CP section 56 so that the CP section 56 performs control based on the data of the data frame at step 204.

If the conclusion at step 201 is 'NO' and the conclusion at step 205 is 'YES', the FV section 55 validates the data frame because the two conclusions agree. Consequently, the validated data frame is provided for the CP section 56 so that the CP section 56 performs control based on the data of the data frame at step 206.

If the conclusion at step 201 is 'NO' and the conclusion at step 205 is 'NO', the FV section 55 invalidates the data frame because the two conclusions contradict each other. That is, the data frame which should be relayed has not been relayed. From this, it is inferred that the sender network of the data frame is different from the destination network. Further it is inferred that the data frame, which is on the communication line of the sender network and should be relayed to the destination network, has appeared on the communication line 6 without being relayed by the data relay unit 4 due to short of two communication lines belonging to the sender network and the destination network. Accordingly, the node 5 already has received or will receive the data frame via the data relay unit 4 properly. Therefore, the invalidated data frame is discarded at step 207. That is, the invalidated data frame is not provided for the CP section 56 so that control is not performed repeatedly based on the data of the same data frame.

(Modifications)

In the third embodiment, a predetermined bit of the data field of a data frame may be assigned to the relay flag similarly to the second embodiment. In this case, the RFC section 54 of the ECU 5 extracts the relay flag from the data field of the received data frame at step 202 or 205. Further in all the above embodiments, a predetermined bit of a field other than the priority field or the data field may be assigned to the relay flag. For example, a predetermined bit of the destination node ID field or the data ID field may be assigned to the relay flag. However, in all the cases, the data relay unit 4, 4A or each ECU 311–315, 321–325, 331–334, 341–345, 351–355, 361–364, 371–375, 381–385, 391–394 has to be configured so as to neglect the bit assigned to the relay flag when it extracts the content from the field.

In the third embodiment, the table included in the SLC section 53 may provide information which represents whether the sender node of a data frame belongs to the same network based on a portion other than the data ID of the data frame. For example, if each data frame includes a sender node ID, the table may provide such information based on the sender node ID of the data frame.

In the above embodiments, each network 11–19 may employ any communication protocol as long as the communication protocol provides the structure of a data frame that includes a header.

According to the present invention, the following advantages are provided. In the above embodiments, when a data frame is sent from a node belonging to one (sender network) of the networks 11–19 to another node (destination node) belonging to another (destination network) of the networks 11–19, the data relay unit 4, 4A sets the relay flag of the data frame to '1' before relaying the data frame to the destination node. Even if the relayed data frame appears on the communication line of the sender network again due to short of the two communication lines belonging to the sender network and destination network, the data relay unit 4, 4A does not relay the data frame again because it can recognize that the data frame has already relayed from the relay flag which is '1'. In this way, the data frame is prevented from being relayed repeatedly. Furthermore, these systems can be easily implemented at low cost because the relay flag is set and checked by the data relay unit 4, 4A.

In the second embodiment, the predetermined bit of the data field of a data frame is assigned to the relay flag. Therefore each node 311–315, 321–325, 331–334 needs to execute a special program for recognizing the predetermined bit of the data field as a bit irrelevant to the data of the data frame, when it extracts the data from the data frame. In contrast to this, in the first embodiment, the predetermined bit of the priority field of a data frame is assigned to the relay flag. Therefore each node 311–315, 321–325, 331–334 does not need to execute such a special program. Therefore the multiplex communication system according to the first embodiment can be easily implemented by modifying the existing multiplex communication system. Furthermore, in the first embodiment, the data frame is given higher priority in the destination network, because the data relay unit 4 sets the relay flag so that the priority of the data frame becomes higher. Therefore there is a strong probability that the data relay unit 4 wins the right to send the data frame to the destination node when a conflict with other nodes arises in the destination network.

In the third embodiment, each node 5 checks whether the received data frame is valid, and discards the data frame if it is determined that the data frame is invalid. In this way, each node 5 is prevented from repeatedly performing control based on the same data of the data frame and the invalid data frame which include the same data.

The multiplex communication system according to the present invention may be used for purposes other than communication among ECUs in a vehicle.

What is claimed is:

1. A multiplex communication system comprising:
   a plurality of networks each of which comprises a communication line and a plurality of nodes connected to the communication line, the nodes communicating each other by exchanging data frames, a predetermined portion of each of the data frames being assigned to an identifier;
   a data relay unit for relaying data frames among the networks, the data relay unit comprising:
   a plurality of send/receive means for sending and receiving data frames, the communication lines of the networks being connected to the respective send/receive means, each of the data frames which is sent by a first node belonging to a first network to a second node belonging to a second network being received by the send/receive means connected to the conununication line of the first network and sent by the send/receive means connected to the communication line of the second network, the first network being any one of the networks, the second network being another one of the networks, the identifier of the data frame being reset by the first node before the data frame is sent to the second node;
   an identifier setting means for setting the identifier of the data frame received by the first send/receive means to a value which represents that the identifier is set before the data frame is sent by the second send/receive means; and
   a relay inhibiting means for checking whether the identifier of the data frame received by the first send/receive means is set and inhibiting the data frame to be sent by the second send/receive means if the identifier is set,
   wherein a third node receives a data frame from a forth node, the third node being any one of the nodes included in the networks, the fourth node being another one of the nodes included in the networks, the identifier of the data frame being reset by the fourth node before the data frame is sent to the third node, the third node comprising:
   a first check means for checking whether the network which includes the forth node is the same as the network which includes the third node;
   a second check means for checking whether the identifier of the data frame received from the fourth node is set; and
   a verification means for receiving results of the checks from the first check means and the second check means and invalidating the received data frame if both the results are 'YES' or both the results are 'NO'.

2. A data relay unit as in claim 1,
   wherein a predetermined bit of a priority field of each data frame is assigned to the identifier as the predetermined portion of the data frame,
   wherein the priority field holds a priority which represents a level of priority which the data frame has over other data frames when the data frame is sent over a communication line, and
   wherein the identifier is defined so that the priority of the data frame becomes higher when the identifier is set.

3. A node for receiving a data frame from a sender node that is another node directly or via a data relay unit, the node comprising:
   a first check means for checking whether the received data frame is a data frame which should not be relayed by the data relay unit;
   a second check means for checking whether the received data frame is actually relayed by the data relay unit when it is sent from the sender node to the node; and
   a verification means for receiving results of the checks from the first check means and the second check means and invalidating the received data frame if both the results are 'YES' or both the results are 'NO'.

4. A method for preventing a data frame from being processed repeatedly in a multiplex communication system including a plurality of networks and a data relay unit, each network including at least one node, the method comprising the steps of:

resetting an identifier that is a predetermined portion of a data frame and sending the data frame from a first node to a second node;

receiving the data frame by the data relay unit if a first network which includes the first node is different from a second network which includes the second node;

checking by the data relay unit whether the identifier of the received data frame is set;

setting by the data relay unit the identifier of the received data frame and sending the data frame from the data relay unit to the second node if it is determined that the identifier of the data frame is not set; and inhibiting the received data frame from being sent to the second node by the data relay unit if it is determined that the identifier of the data frame is set;

receiving the data frame by the second node;

checking by the second node whether the first network is the same as the second network;

checking by the second node whether the identifier of the received data frame is set; and invalidating the received data frame by the second node if both the results of the checks are 'YES' or both the results of the checks are 'NO'.

5. A method as in claim 4 wherein a predetermined bit of a priority field of each data frame is assigned to the identifier as the predetermined portion of the data frame, wherein the priority field holds a priority which represents a level of priority which the data frame has over other data frames when the data frame is sent over a communication line, and wherein the identifier is defined so that the priority of the data frame become higher when the identifier is set.

* * * * *